United States Patent [19]

Matsuoka

[11] Patent Number: 4,603,599
[45] Date of Patent: Aug. 5, 1986

[54] STEERING SYSTEM EQUIPPED WITH STEERING WHEEL CENTER PAD ANTI-ROTATION MECHANISM

[75] Inventor: Hideoki Matsuoka, Isehara, Japan
[73] Assignee: Nissan Motor Co., Ltd., Japan
[21] Appl. No.: 737,443
[22] Filed: May 24, 1985
[30] Foreign Application Priority Data

May 28, 1984 [JP] Japan ................. 59-107994

[51] Int. Cl.$^4$ ............................................. B62D 1/10
[52] U.S. Cl. .................... 74/492; 74/484 R; 74/552; 200/61.54; 403/157
[58] Field of Search .............. 74/484 R, 492, 552; 200/61.54; 403/157, 158, 159, 79

[56] References Cited

FOREIGN PATENT DOCUMENTS 57-163448 10/1982 Japan .
57-198141 12/1982 Japan ..................... 200/61.54

Primary Examiner—Allan D. Herrmann
Attorney, Agent, or Firm—Leydig, Voit & Mayer, Ltd.

[57] ABSTRACT

A pinion and upper and lower internal gears are adapted to be subassembled to a hub portion of a steering wheel prior to mounting on a steering shaft. An anchor leg is provided to the lower end of the lower internal gear and has a pair of opposed lateral sides which are opposed in the lateral direction perpendicular to the diametrical direction of the lower internal gear. A location arm is provided to the upper end of a stationary column and has a bifurcated upper end to loosely receive therewithin the anchor leg. The bifurcated end of the location arm is resiliently deformed by a screw driven thereinto to contact the lateral opposed sides of the anchor leg.

3 Claims, 2 Drawing Figures

STEERING SYSTEM EQUIPPED WITH STEERING WHEEL CENTER PAD ANTI-ROTATION MECHANISM

BACKGROUND OF THE INVENTION

1. Field of the Invention

The present invention relates in general to steering systems for road vehicles and more particularly to a steering system of the type equipped with an anti-rotation mechanism for holding a steering wheel center pad and so on stationary irrespective of rotation of a steering wheel.

2. Description of the Prior Art

A steering system equipped with such an anti-rotation mechanism is disclosed, e.g. in Japanese Provisional Utility Model Publication No. 57-163448. The steering system includes a lower internal gear fastened with screws to an end of a steering column, an upper internal gear rotatably mounted on a hub portion of a steering wheel, and a pinion rotatably mounted on the hub portion and meshing with both of the internal gears so that the upper internal gear and the steering wheel center pad and so on mounted thereon are held stationary irrespective of rotation of the steering wheel.

A disadvantage of the prior art steering system is that in assembly of the steering system the lower internal gear cannot be subassembled to the hub portion of the steering wheel since the lower internal gear is designed so as to be fixedly attached to the steering column. For this reason, upon attachment of the hub portion of the steering wheel to the steering shaft, it is required to engage the pinion with the lower internal gear in such a manner that the upper internal gear, the steering wheel center pad and so on are placed in a predetermined angular position relative to the steering shaft, resulting in a difficult assembly work or a difficulty in locating the pad and so on in a predetermined angular position relative to the steering shaft.

Another disadvantage is the difficulty in axially aligning the upper and lower internal gears since they are designed to be mounted on different constituent parts, leading to a problem that if alignment of the upper and lower internal gears is not attained, play of the upper internal gear and the center pad, etc. mounted thereon will result to deteriorate the quality of the steering system.

SUMMARY OF THE INVENTION

In accordance with the present invention, there is provided a novel and improved steering system which comprises a stationary column having an upper end portion, a steering shaft surrounded by the column and having an upper end portion projecting from the upper end of the column, a steering wheel having a hub portion at which it is mounted on the upper end portion of the steering shaft for rotation therewith, the hub portion having an annular flange section and a pair of coaxial upper and lower sleeve sections projecting upwardly and downwardly from the inner periphery of the flange section, a pair of upper and lower internal gears rotatably mounted on the upper and lower sleeve sections, respectively, a pinion rotatably mounted on the hub portion and meshed with the upper and lower internal gears, an anchor leg provided to the lower end of the lower internal gear and having a pair of opposed lateral sides which are opposed in the direction perpendicular to the diametrical direction of the lower internal gear, a location arm provided to the upper end of the column and having a bifurcated upper end loosely receiving therewithin the anchor leg, and fastening means for resiliently deforming the bifurcated end of the location arm and bringing the same into contact with the opposed lateral sides of the anchor leg.

The above structure is quite effective for obviating the above noted disadvantages inherent in the prior art device.

It is accordingly an object of the present invention to provide a novel and improved steering system of the type having a steering wheel center pad anti-rotation mechanism which makes it possible to subassemble a pinion and upper and lower internal gears to a hub portion of a steering wheel prior to mounting to a steering wheel.

It is another object of the present invention to provide a novel and improved steering system of the aforementioned character which can make mounting of the subassembly to the steering shaft easier.

It is a further object of the present invention to provide a novel and improved steering system of the aforementioned character which can prevent play of the lower internal gear relative to a stationary column assuredly and accuratedly and thereby prevent play of a steering wheel center pad assuredly and accurately.

BRIEF DESCRIPTION OF THE DRAWINGS

The features and advantages of the steering system according to the present invention will become more clearly appreciated from the following description taken in conjunction with the accompanying drawings, in which.

DETAILED DESCRIPTION OF THE PREFERRED EMBODIMENT

Figure 1:
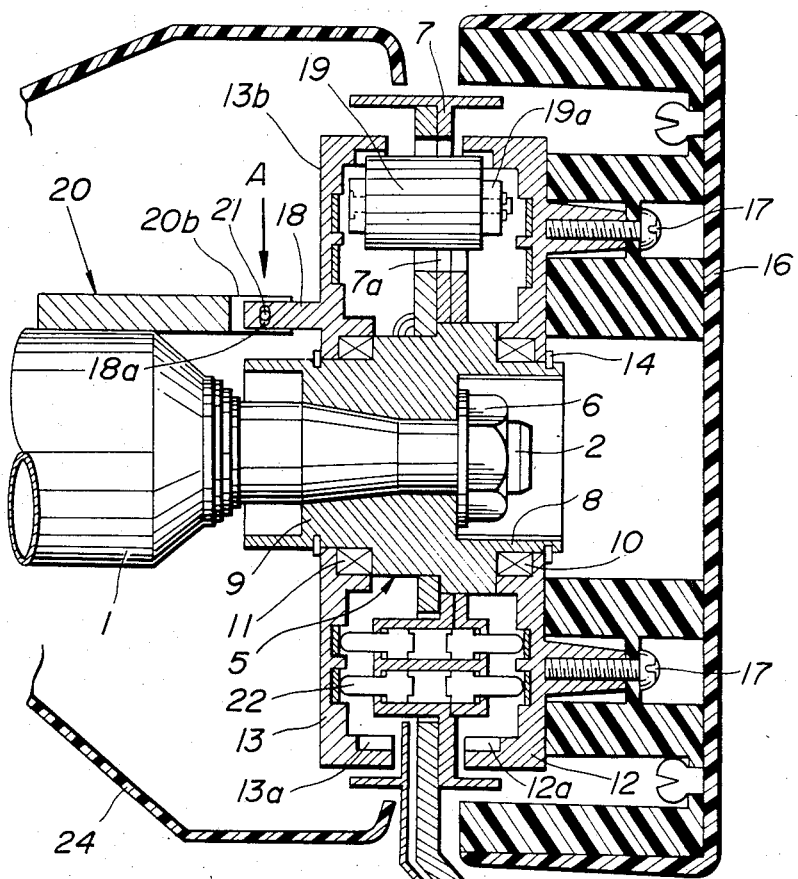
FIG. 1 is a fragmentary sectional view of a steering system according to an embodiment of the present invention.
Figure 2:
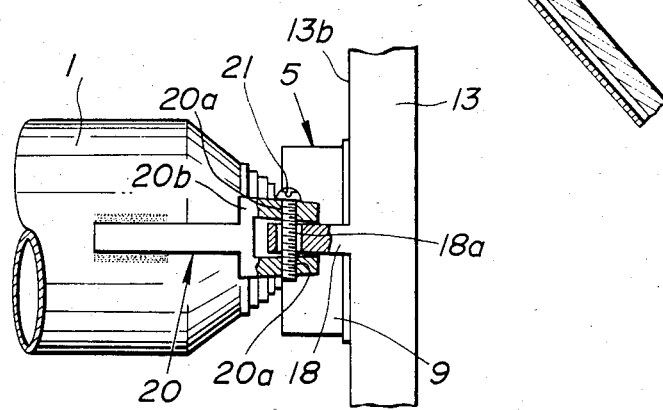
FIG. 2 is a view taken along the arrow "A" in FIG. 1.

Referring to the drawings, a steering system according to an embodiment of the present invention comprises a steering shaft 2 which is concentrically surrounded by a jacket or column 1 which is in turn supported on a vehicle body by means of a column bracket or the like though not shown in the drawings. On the upper end of the steering shaft 2 there is mounted a steering wheel 3 which includes a spoke portion or portions 4 and a hub portion 5 integral therewith. The steering wheel 3 is secured to the steering shaft 2 by a nut 6 for rotation therewith. The hub portion 5 consists of an annular flange section 7, to the outer periphery of which is connected the spoke portion or portions 4, and coaxial upper and lower sleeve sections 8, 9. The annular flange section 7 is formed with a pinion accommodating opening 7a. On the upper and lower sleeve sections 8, 9 there are rotatably and coaxially mounted by way of bearings 10, 11 a pair of upper and lower internal gears 12, 13 which are prevented from slipping off from the sleeve sections 8, 9 by means of snap rings 14, 15, respectively. The upper and lower internal gears 12, 13 have teeth 12a, 13a which are of the same pitch circle diameter and diametrical pitch. On the upper internal gear 12 there is mounted a steering wheel center pad 16 which in turn mounts thereon various parts such as for example a switch gear and its switch buttons. The steering wheel center pad 16 is fastened to the upper internal gear 12 by screws 17, 17. The lower internal gear 13 has at the lower end 13b thereof an achor leg 18 projecting downwardly therefrom in a manner to have a pair of lateral opposed sides which are opposed in the direction perpendicular to the diametrical direction of the lower internal gear 13. The anchor leg 18 is formed at the lower end thereof with a transverse hole 18a extending between the aforementioned lateral sides thereof. Within the aforementioned pinion accommodating opening 7a there is disposed a pinion 19 which is rotatably carried or mounted on the hub portion 5 by means of a bracket 19a in a manner to mesh with the teeth 12a, 13a of the upper and lower internal gears 12, 13. A location arm 20 made of metal is provided which is welded or otherwise secured at the lower end thereof to the upper end of the column 1. The arm 20 has a forked or bifurcated upper end 20b formed with a pair of axially aligned threaded holes 20a, 20a. The lower free end of the anchor leg 18 is inserted into the bifurcated upper end 20b of the location arm 20 and fastened thereto by a screw 21 driven into the threaded holes 20a, 20a through the transverse hole 18a of the anchor leg 18. In the above, it is to be noted that the bifurcated upper end 20b of the location arm 20 is adapted to loosely receive therewithin the anchor leg 18 for ease of installation and be resiliently deformed to contact the opposed lateral sides of the anchor leg 18 when fastened by the screw 21 so that the lower internal gear is assuredly and accuratedly prevented from play relative to the stationary column 1.

In the meantime, the reference numeral 22 is a contactor for providing electrical connection between the upper and lower internal gears 12, 13. The reference numeral 23 is a dust cover disposed around the aforementioned annular flange section 7 of the hub portion 5 so as to close the space between the steering wheel center pad 16 and a garnish 24.

In assembly, the pinion 19, bearings 10, 11, upper and lower internal gears 12, 13, steering wheel center pad 16 are first subassembled to the hub portion 5 of the steering wheel 3. The hub portion 5 is then fastened to the upper end of the steering shaft 2 while at the same time the anchor leg 18 is inserted into the bifurcated upper end 20b of the arm 20 and fastened thereto.

From the above, it is to be noted that circumferential alignment (i.e., alignment of angular positions) of the upper and lower internal gears 12, 13 can be made upon subassembly, i.e., upon the time when the upper and lower internal gears 12, 13 are mounted on the hub portion 5 of the steering wheel 3, making it possible to obviate such a difficult assembly work as is encountered in the prior art device.

It is further to be noted that since the pinion 19 and the upper and lower internal gears 12, 13 are mounted on the common element, i.e., the hub portion 5, axial alignment of the upper and lower internal gears 12, 13 as well as uniform engagement between the pinion 19 and the upper and lower internal gears 12, 13 can be attained accurately and assuredly, making it possible to prevent play of the upper internal gear 12 and therefore the steering wheel center pad 16 and thereby improve the quality of the steering system.

It is still further to the noted that engagement of the anchor leg 18 and the location arm 20 is easily and assuredly attained, the assembly work can be made further easier and play of the steering wheel center pad 16 can be prevented more assuredly and accuratedly.

While the location arm 20 is described in the above as being made of metal, it is not limited to be so but can otherwise be made of a suitable synthetic resinous material to be fastened with a screw to the column 1. Furthermore, the location arm 20 may have, in place of the bifurcated upper end, an upper end formed with a pair of opposed lateral sides which are opposed in the direction perpendicular to the diametrical direction of the lower internal gear, while on the other hand the anchor leg 18 may have a bifurcated lower end receiving therewithin the upper end of the location arm 20.

What is claimed is:

1. A steering system comprising:
a stationary column having an upper end portion;
a steering shaft surrounded by said column and having an upper end portion projecting from the upper end of said column;
a steering wheel having a hub portion at which it is mounted on the upper end portion of said steering shaft for rotation therewith;
said hub portion having an annular flange section and a pair of coaxial upper and lower sleeve sections projecting upwardly and downwardly from the inner periphery of said flange section;
a pair of upper and lower internal gears rotatably mounted on said upper and lower sleeve sections, respectively;
a pinion rotatably mounted on said hub portion and meashed with said upper and lower internal gears;
an anchor leg provided to the lower end of said lower internal gear;
a location arm provided to the upper end of said column;
one of said anchor leg and said location arm having an attaching end formed with a pair of opposed lateral sides which are opposed in the direction perpendicular to the diametrical direction of said lower internal gear;
the other of said anchor leg and said location arm having a bifurcated end loosely receiving therewithin said attaching end; and
fastening means for resiliently deforming said bifurcated end and bringing the same into contact with said opposed lateral sides of said attaching end.

2. A steering system comprising:
a stationary column having an upper end portion;
a steering shaft surrounded by said column and having an upper end portion projecting from the upper end of said column;
a steering wheel having a hub portion at which it is mounted on the upper end portion of said steering shaft for rotation therewith;
said hub portion having an annular flange section and a pair of coaxial upper and lower sleeve sections projecting upwardly and downwardly from the inner periphery of said flange section;
a pair of upper and lower internal gears rotatably mounted on said upper and lower sleeve sections, respectively;
a pinion rotatably mounted on said hub portion and meshed with said upper and lower internal gears;
an anchor leg provided to the lower end of said lower internal gear and having a pair of opposed lateral sides which are opposed in the direction pependicular to the diametrical direction of said lower internal gear;

a location arm provided to the upper end of said column and having a bifurcated upper end loosely receiving therewithin said anchor leg; and fastening means for resiliently deforming the bifurcated end of said location arm and bringing the same into contact with the opposed lateral sides of said anchor leg.

3. A steering system as set forth in claim 2, in which said anchor leg has at the lower end thereof a transverse hole extending between said opposed lateral sides thereof, said location arm having at the free end thereof a pair of axially aligned threaded holes, said fastening means comprising a screw driven into said threaded holes through said transverse hole.

* * * * *